US010928880B2

(12) United States Patent
Sultenfuss et al.

(10) Patent No.: US 10,928,880 B2
(45) Date of Patent: *Feb. 23, 2021

(54) POWER STORAGE ADAPTER FOR COMMUNICATING BATTERY DATA WITH A PORTABLE INFORMATION HANDLING SYSTEM (71) Applicant: Dell Products L.P., Round Rock, TX (US)

(72) Inventors: Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,558

(22) Filed: Jun. 23, 2017

(65) Prior Publication Data
US 2018/0373308 A1    Dec. 27, 2018

(51) Int. Cl.
G06F 1/00 (2006.01)
G06F 1/3212 (2019.01)
G06F 1/26 (2006.01)
G06F 1/20 (2006.01)

(52) U.S. Cl.
CPC ............ *G06F 1/3212* (2013.01); *G06F 1/206* (2013.01); *G06F 1/263* (2013.01); *G06F 1/266* (2013.01)

(58) Field of Classification Search
CPC ...................................................... G06F 1/32
See application file for complete search history.

(56) References Cited

U.S. PATENT DOCUMENTS

| 4,672,228 | A | 6/1987 | Swoboda |
| 5,598,327 | A | 1/1997 | Somerville et al. |
| 5,752,046 | A | 5/1998 | Oprescu et al. |
| 5,811,895 | A | 9/1998 | Suzuki et al. |
| 6,057,609 | A | 5/2000 | Nagai et al. |
| 6,293,700 | B1 | 9/2001 | Lund et al. |
| 6,477,054 | B1 | 11/2002 | Hagerup |
| 6,993,618 | B2 * | 1/2006 | Chen ................. G06F 3/08 710/301 |
| 7,127,228 | B2 | 10/2006 | Chang et al. |

(Continued)

FOREIGN PATENT DOCUMENTS

FR    2989323    10/2013

OTHER PUBLICATIONS

Universal Serial Bus, "USB Power Delivery." Retrieved from <http://www.usb.org/developers/powerdelivery/> on Jun. 28, 2017; 3 pages.

(Continued)

*Primary Examiner* — Mohammed H Rehman
(74) *Attorney, Agent, or Firm* — Baker Botts L.L.P.

(57) ABSTRACT

A power storage adapter coupled to a portable information handling system using a variable power bus may receive first battery data from an embedded controller of the portable information handling system. The first battery data may be used by a battery management unit in the power storage adapter for power management of a battery. The power storage adapter may also collect second battery data from other portable information handling systems and send the second battery data back to the embedded controller.

18 Claims, 4 Drawing Sheets

(56) References Cited

U.S. PATENT DOCUMENTS

| | | | |
|---|---|---|---|
| 7,243,246 B2 | 7/2007 | Allen et al. | |
| 7,405,535 B2 | 7/2008 | Frerking et al. | |
| 7,536,569 B2 | 5/2009 | Montero et al. | |
| 7,538,518 B2 | 5/2009 | Wang et al. | |
| 7,545,120 B2 | 6/2009 | Breen et al. | |
| 7,592,716 B2 | 9/2009 | Zhu et al. | |
| 7,646,107 B2 | 1/2010 | Smith | |
| 7,989,981 B2 | 8/2011 | Zhang | |
| 8,164,904 B2 | 4/2012 | Matz et al. | |
| 8,188,594 B2 | 5/2012 | Ganesan et al. | |
| 8,830,073 B2 | 9/2014 | Sims et al. | |
| 8,994,321 B2 | 3/2015 | Knowlton | |
| 9,166,083 B2 | 10/2015 | Meinel et al. | |
| 9,172,219 B2 | 10/2015 | Mills et al. | |
| 9,197,092 B2 | 11/2015 | Verdun et al. | |
| 9,263,912 B2 | 2/2016 | Verdun et al. | |
| 9,300,015 B2 | 3/2016 | Chang et al. | |
| 9,448,603 B2 * | 9/2016 | Rothschild | H02J 50/10 |
| 9,524,018 B2 | 12/2016 | Sultenfuss et al. | |
| 9,568,990 B2 | 2/2017 | Chueh et al. | |
| 9,681,558 B2 | 6/2017 | Chen et al. | |
| 9,693,446 B2 | 6/2017 | Ragg | |
| 9,780,671 B2 | 10/2017 | Chan et al. | |
| 9,805,890 B2 | 10/2017 | Doljack et al. | |
| 9,812,878 B1 | 11/2017 | Stieber et al. | |
| 9,867,275 B2 | 1/2018 | Chen | |
| 9,887,571 B1 | 2/2018 | Thompson et al. | |
| 10,128,764 B1 | 11/2018 | Vinciarelli | |
| 10,181,731 B1 | 1/2019 | Thompson et al. | |
| 10,181,739 B1 | 1/2019 | Thompson et al. | |
| 10,283,975 B1 | 5/2019 | Venkatasamy et al. | |
| 2003/0085626 A1 | 5/2003 | Odaohhara | |
| 2003/0212923 A1 | 11/2003 | Coppock et al. | |
| 2004/0075418 A1 | 4/2004 | Densham et al. | |
| 2004/0085694 A1 | 5/2004 | Germagian | |
| 2004/0125618 A1 | 7/2004 | Rooij et al. | |
| 2004/0135565 A1 | 7/2004 | Douma et al. | |
| 2005/0052164 A1 | 3/2005 | Sakai et al. | |
| 2005/0125709 A1 | 6/2005 | McKim | |
| 2005/0131645 A1 * | 6/2005 | Panopoulos | B60P 1/5457 |
| | | | 701/472 |
| 2005/0141252 A1 | 6/2005 | Mollo | |
| 2005/0174094 A1 | 8/2005 | Purdy et al. | |
| 2005/0275383 A1 | 12/2005 | Ishishita | |
| 2006/0022637 A1 | 2/2006 | Wang et al. | |
| 2006/0164038 A1 | 7/2006 | Demers et al. | |
| 2006/0214510 A1 | 9/2006 | Patel | |
| 2007/0073420 A1 * | 3/2007 | Lanni | G05F 1/00 |
| | | | 700/22 |
| 2007/0079153 A1 | 4/2007 | Bain et al. | |
| 2007/0103110 A1 | 5/2007 | Sagoo | |
| 2007/0200433 A1 | 8/2007 | Kelty | |
| 2007/0248877 A1 | 10/2007 | Qahoug | |
| 2007/0279004 A1 | 12/2007 | Wang et al. | |
| 2008/0222431 A1 | 9/2008 | Paniagua et al. | |
| 2008/0278111 A1 | 11/2008 | Genies et al. | |
| 2008/0315826 A1 | 12/2008 | Alberth, Jr. et al. | |
| 2009/0001937 A1 | 1/2009 | Densham et al. | |
| 2009/0015976 A1 | 1/2009 | Hara | |
| 2009/0066294 A1 | 3/2009 | Sabram | |
| 2009/0076661 A1 | 3/2009 | Pearson et al. | |
| 2009/0146826 A1 | 6/2009 | Gofman et al. | |
| 2009/0177906 A1 * | 7/2009 | Paniagua, Jr. | G06F 1/26 |
| | | | 713/340 |
| 2009/0184687 A1 | 7/2009 | Schroeder | |
| 2009/0244944 A1 | 10/2009 | Jang et al. | |
| 2010/0038963 A1 | 2/2010 | Shetty et al. | |
| 2010/0067197 A1 | 3/2010 | Guccione et al. | |
| 2011/0018360 A1 | 1/2011 | Baarman | |
| 2011/0045327 A1 | 2/2011 | Yawata et al. | |
| 2011/0068626 A1 | 3/2011 | Terlizzi et al. | |
| 2011/0140713 A1 | 6/2011 | Snowdon et al. | |
| 2011/0148197 A1 | 6/2011 | Hernandez | |
| 2011/0183178 A1 | 7/2011 | Sohn | |
| 2011/0225073 A1 | 9/2011 | Won et al. | |
| 2011/0227407 A1 | 9/2011 | Ransom | |
| 2011/0260681 A1 | 10/2011 | Guccione et al. | |
| 2011/0279078 A1 | 11/2011 | Hara | |
| 2011/0293984 A1 | 12/2011 | Han et al. | |
| 2012/0025630 A1 | 2/2012 | Tsuda | |
| 2012/0084575 A1 | 4/2012 | Flores et al. | |
| 2012/0091815 A1 | 4/2012 | Richards, III | |
| 2012/0123604 A1 | 5/2012 | Littrell | |
| 2012/0151240 A1 | 6/2012 | Robinson et al. | |
| 2012/0181990 A1 | 7/2012 | Asakura et al. | |
| 2012/0201062 A1 | 8/2012 | Lee | |
| 2012/0256484 A1 | 10/2012 | Kemp | |
| 2012/0316695 A1 | 12/2012 | Chen | |
| 2012/0319656 A1 | 12/2012 | Toma | |
| 2013/0035802 A1 | 2/2013 | Khaitan | |
| 2013/0043827 A1 | 2/2013 | Weinstein et al. | |
| 2013/0069447 A1 | 3/2013 | Sato | |
| 2013/0100568 A1 | 4/2013 | Mistry et al. | |
| 2013/0106192 A1 | 5/2013 | Tsukamoto | |
| 2013/0159792 A1 | 6/2013 | Brooks et al. | |
| 2013/0246815 A1 | 9/2013 | Uehara | |
| 2013/0314039 A1 | 11/2013 | Weber et al. | |
| 2013/0342011 A1 | 12/2013 | Robinson et al. | |
| 2014/0018969 A1 | 1/2014 | Forbes | |
| 2014/0035380 A1 | 2/2014 | Stevens et al. | |
| 2014/0035746 A1 | 2/2014 | Leyden | |
| 2014/0070774 A1 | 3/2014 | Terlizzi et al. | |
| 2014/0157065 A1 | 6/2014 | Ong | |
| 2014/0195826 A1 | 7/2014 | Wojcik | |
| 2014/0210267 A1 | 7/2014 | Ishida et al. | |
| 2014/0214223 A1 | 7/2014 | Tsunoda et al. | |
| 2014/0217958 A1 | 8/2014 | Verdun et al. | |
| 2014/0239882 A1 | 8/2014 | Yang | |
| 2014/0306539 A1 | 10/2014 | Rostami | |
| 2014/0312691 A1 | 10/2014 | Doljack et al. | |
| 2015/0037662 A1 | 2/2015 | Pinon et al. | |
| 2015/0063473 A1 | 3/2015 | Nishibayashi | |
| 2015/0132615 A1 | 5/2015 | Yun | |
| 2015/0165917 A1 | 6/2015 | Robers et al. | |
| 2015/0169497 A1 * | 6/2015 | Fried | G06F 12/0831 |
| | | | 709/214 |
| 2015/0277461 A1 | 10/2015 | Anderson | |
| 2015/0280457 A1 | 10/2015 | Jung | |
| 2015/0303727 A1 | 10/2015 | Jeong | |
| 2015/0311705 A1 | 10/2015 | Terlizzi et al. | |
| 2015/0314701 A1 | 11/2015 | Morioka et al. | |
| 2015/0357834 A1 | 12/2015 | McLean | |
| 2015/0364921 A1 | 12/2015 | Tatsuta et al. | |
| 2016/0099608 A1 | 4/2016 | Jao et al. | |
| 2016/0111903 A1 | 4/2016 | Miller | |
| 2016/0197504 A1 | 7/2016 | Hsia | |
| 2016/0218539 A1 | 7/2016 | Herrmann | |
| 2016/0231777 A1 | 8/2016 | Decamp | |
| 2016/0241148 A1 | 8/2016 | Kizilyalli et al. | |
| 2016/0246316 A1 | 8/2016 | Lim et al. | |
| 2016/0261128 A1 | 9/2016 | Johnston | |
| 2016/0274607 A1 | 9/2016 | Kudo | |
| 2016/0297311 A1 | 10/2016 | Butler et al. | |
| 2016/0322858 A1 | 11/2016 | Miller | |
| 2016/0329612 A1 | 11/2016 | Jung | |
| 2016/0359426 A1 | 12/2016 | Jitaru et al. | |
| 2017/0005494 A1 | 1/2017 | Li | |
| 2017/0040815 A1 | 2/2017 | Todasco | |
| 2017/0077738 A1 | 3/2017 | Park | |
| 2017/0085098 A1 | 3/2017 | Sporck et al. | |
| 2017/0090530 A1 | 3/2017 | Filser | |
| 2017/0104330 A1 | 4/2017 | Nakaishi | |
| 2017/0126041 A1 | 5/2017 | Sato | |
| 2017/0140887 A1 | 5/2017 | Waters | |
| 2017/0177069 A1 | 6/2017 | Bedare et al. | |
| 2017/0225586 A1 | 8/2017 | Zhang et al. | |
| 2017/0293335 A1 | 10/2017 | Dunstan et al. | |
| 2018/0143916 A1 | 5/2018 | Gupta et al. | |
| 2018/0143932 A1 | 5/2018 | Lawless et al. | |
| 2018/0181171 A1 | 6/2018 | Jang et al. | |
| 2018/0233914 A1 | 8/2018 | Miki et al. | |
| 2018/0351399 A1 | 12/2018 | Frey | |
| 2018/0375358 A1 | 12/2018 | Sultenfuss et al. | |
| 2018/0375359 A1 | 12/2018 | Sultenfuss et al. | |

(56) References Cited

U.S. PATENT DOCUMENTS

2018/0375360 A1 12/2018 Sultenfuss et al.
2018/0375361 A1 12/2018 Sultenfuss et al.
2019/0050037 A1 2/2019 Wang et al.
2019/0065422 A1 2/2019 Sporck et al.
2019/0319474 A1 10/2019 Tanaka et al.

OTHER PUBLICATIONS

SMBus, "System Management Bus (SMBus)." Retrieved from <www.smbus.org> on Jun. 28, 2017; 2 pages.
UEFI, "Unified Extensible Firmware Interface (UEFI) Specification" Retrieved from <http://uefi.org>, May 2017; 2899 pages, Jun. 28, 2017.
Wikipedia, "USB." Retrieved from <https://en.wikipedia.org/wiki/USB> on Mar. 19, 2017; 35 pages, Mar. 19, 2017.
Waffenschmidt, Eberhard. "Qi Coupling Factor." Qi Coupling Factor, www.wirelesspowerconsortium.com/technology/coupling-factor.html, Retrieved Jan. 3, 2018; 5 pages.
Waffenschmidt, Eberhard. "Resonant Coupling." Resonant Coupling, https://www.wirelesspowerconsortium.com/technology/resonant-coupling.html; Retrieved Jan. 3, 2018; 4 pages.
Wow! A true free-positioning 5-phone charger—Wireless Power Consortium Blog. Wireless Power Consortium. Web. <http://www.wirelesspowerconsortium.com/blog/67/wow-a-true-free-positioning-5-phone-charger>; Retrieved Jan. 3, 2018; 6 pages.
Received STIC search report from EIC 2800 searcher John DiGeronimo on Dec. 7, 2017; 31 pages.
Received STIC search report from EIC 2800 searcher Benjamin Martin on Sep. 28, 2017; 14 pages.
English machine translation of Souad et al. (FR 2989323) published Oct. 18, 2013.

\* cited by examiner

POWER STORAGE ADAPTER FOR COMMUNICATING BATTERY DATA WITH A PORTABLE INFORMATION HANDLING SYSTEM

BACKGROUND

Field of the Disclosure

This disclosure relates generally to information handling systems and, more particularly, to a power storage adapter for communicating battery data with a portable information handling system.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed power storage adapter (PSA) is for communicating battery data with a portable information handling system. The power storage adapter may include a first PSA port and a second PSA port for coupling the power storage adapter to a variable power bus, a PSA battery, a PSA battery management unit (BMU), a PSA controller having access to memory media storing instructions executable by the PSA controller. The instructions may be executable by the PSA controller to, using a communication channel at the first PSA port over the variable power bus with a first portable information handling system, receive first battery data from the first portable information handling system. In the power storage adapter, the first battery data may include first battery parameters that affect electronic operation of the PSA battery. The instructions may also be executable by the PSA controller to, using the communication channel, send second battery data to the first portable information handling system. In the power storage adapter, the second battery data may include battery measurements collected by a sensor accessible to the PSA battery management unit.

In any of the disclosed embodiments of the power storage adapter, the first battery parameters that affect electronic operation of the PSA battery may further include parameters that affect charging and discharging of the PSA battery by the PSA battery management unit when the power storage adapter is used with the portable information handling system.

In any of the disclosed embodiments of the power storage adapter, the first battery parameters may further include at least one of: a beginning of day time stamp, an end of day time stamp, and an average daily power.

In any of the disclosed embodiments of the power storage adapter, the sensors may further include first sensors accessible to the PSA battery management unit, the first sensors comprising at least one of: a temperature sensor, a voltage sensor, a charging current sensor, and a discharging current sensor.

In any of the disclosed embodiments, the power storage adapter may further include instructions to use at least some of the first battery data and the second battery data to determine a battery capacity of the PSA battery.

In any of the disclosed embodiments, the power storage adapter may further include instructions to use at least some of the first battery data and the second battery data to predict a battery capacity of the PSA battery at a given time in the future.

In any of the disclosed embodiments of the power storage adapter, the second battery data may further include an identifier for a second portable information handling system coupled to the second PSA port to receive electrical power from the power storage adapter, and power consumption data for the second information handling system, including at least one of: a charging time, a charging duration, a charging power, and a charging voltage.

In any of the disclosed embodiments of the power storage adapter, the second portable information handling system may include a cellular telephone.

In any of the disclosed embodiments of the power storage adapter, the communication channel may enable communication between the PSA controller and an embedded controller included with the first portable information handling system.

In any of the disclosed embodiments of the power storage adapter, the first PSA port and the second PSA port may be USB Type-C ports, while the variable power bus may be a USB Type-C bus.

In another aspect, a disclosed method is for communicating battery data with a portable information handling system. The method may include using a communication channel at a first PSA port of a power storage adapter, the communication channel connecting the power storage adapter to a first portable information handling system over a variable power bus, receiving first battery data from the first portable information handling system. In the method, the first battery data may further include first battery parameters that affect electronic operation of a PSA battery included with the power storage adapter. The method may also include using the communication channel, sending second battery data to the first portable information handling system. In the method, the second battery data may further include battery measurements collected by a sensor accessible to a PSA battery management unit included with the power storage adapter.

In any of the disclosed embodiments of the method, the first battery parameters that affect electronic operation of the PSA battery may further include parameters that affect charging and discharging of the PSA battery by the PSA battery management unit when the power storage adapter is used with the portable information handling system.

In any of the disclosed embodiments of the method, the first battery parameters may further include at least one of: a beginning of day time stamp, an end of day time stamp, and an average daily power.

In any of the disclosed embodiments of the method, the sensors may further include first sensors accessible to the PSA battery management unit, the first sensors including at least one of: a temperature sensor, a voltage sensor, a charging current sensor, and a discharging current sensor.

In any of the disclosed embodiments, the method may further include using at least some of the first battery data and the second battery data to determine a battery capacity of the PSA battery.

In any of the disclosed embodiments, the method may further include using at least some of the first battery data and the second battery data to predict a battery capacity of the PSA battery at a given time in the future.

In any of the disclosed embodiments of the method, the second battery data may further include an identifier for a second portable information handling system coupled to a second PSA port included with the power storage adapter to receive electrical power from the power storage adapter, and power consumption data for the second information handling system, including at least one of: a charging time, a charging duration, a charging power, and a charging voltage.

In any of the disclosed embodiments of the method, the second portable information handling system may include a cellular telephone.

In any of the disclosed embodiments of the method, the first PSA port and the second PSA port may be USB Type-C ports, while the variable power bus may be a USB Type-C bus.

In any of the disclosed embodiments of the method, the communication channel may enable communication between the PSA controller and an embedded controller included with the first portable information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, and 4 wherein like numbers are used to indicate like and corresponding parts.

Figure 1:
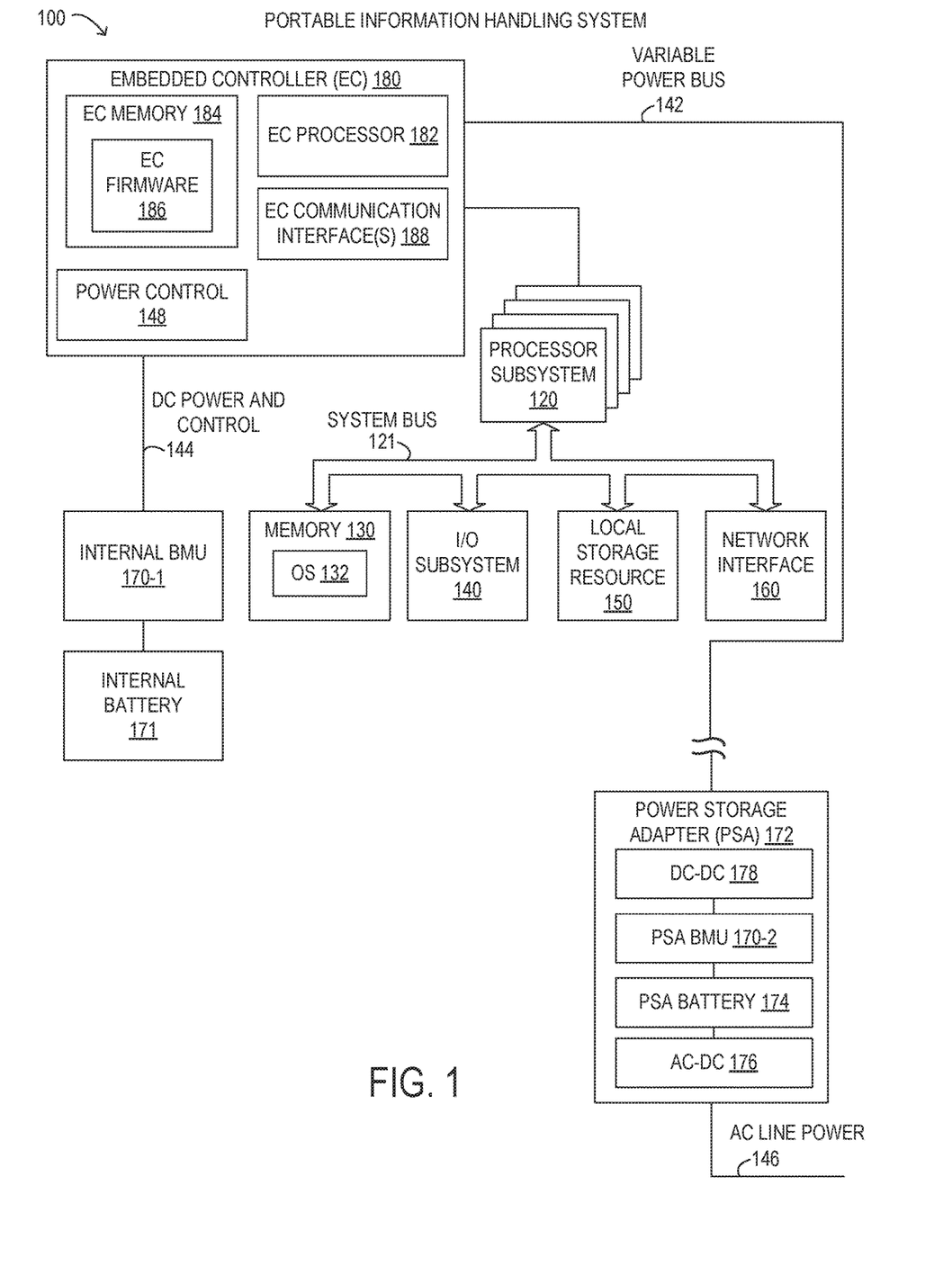
FIG. 1 is a block diagram of selected elements of an embodiment of a portable information handling system.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170-1 that manages an internal battery 171. Furthermore, information handling system 100 is shown removably coupled to a power storage adapter 172 that incorporates various high efficiency features for use with portable information handling system 100, as disclosed herein. As shown, power storage adapter 172 may be an external device to portable information handling system 100 and may be coupled to portable information handling system 100 using a variable power bus 142, for example, using an appropriate connector, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170-1. Thus, EC processor 182 may have access to EC memory 184, which may store EC firmware 186, representing instructions executable by EC processor 182.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for managing electrical power connections between power storage adapter 172, internal BMU 170-1, and to portable information handling system 100. In some embodiments, power control 148 may be implemented as a separate controller external to embedded controller 180. For example, when variable power bus 142 supplies electrical power to portable information handling system 100, power control 148 may determine whether the electrical power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of power during the low power state and managing operation of portable information handling system 100 during the low power state. Power control 148 may accordingly route electrical power and communicate with internal BMU 170-1 via DC power and control 144, which may represent suitable connections between embedded controller 180 and internal BMU 170-1, for example. It is noted that in some embodiments, at least certain portions of power control 148 may be implemented using EC firmware 186, such as specialized executable instructions for power management and control.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140. In particular embodiments, variable power bus 142 may be used to receive DC power from an external source, such as a power storage adapter 172. For example, the DC power received from the external source may be routed via DC power connection 144 to internal BMU 170-1 for purposes of charging internal battery 171 or otherwise powering portable information handling system 100.

In certain embodiments, variable power bus 142 is implemented according to an industry standard, such as a Universal Serial Bus (USB), which is developed and supported by the USB Implementers Forum, Inc. (USB IF, www.usb.org). In particular, variable power bus 142 may be implemented as a USB Type-C bus that may support different USB devices, such as USB Type-C devices with USB Type-C connectors. Accordingly, variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

| USB Power Delivery revision 2.0, version 1.2 source power rules. | | | | |
|---|---|---|---|---|
| Source Output Power [W] | Current [A] at +5 V DC | Current [A] at +9 V DC | Current [A] at +15 V DC | Current [A] at +20 V DC |
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 W to 100 W.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

As illustrated in FIG. 1, each of portable information handling system 100 and power storage adapter 172 may include a battery management unit (BMU) 170 that controls operation of a respective battery. In particular implementations, BMU 170 may be embedded within a respective battery whose operation BMU 170 controls. For example, internal BMU 170-1 within portable information handling system 100 may control operation of an internal battery 171, while PSA BMU 170-2 within power storage adapter 172 may control operation of a PSA battery 174. More specifically, BMU 170-1 may monitor information associated with, and control charging operations of, internal battery 171, while BMU 170-2 may monitor information associated with, and control charging operations of, PSA battery 174. In operation, each BMU 170 may control operation of a respective battery to enable sustained operation, such as by protecting the battery. Protection of the battery by BMU 170 may comprise preventing the battery from operating outside of safe operating conditions, which may be defined in terms of certain allowable voltage and current ranges over which the battery can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, a battery (such as internal battery 171 or PSA battery 174 illustrated in FIG. 1) may be considered to be discharged when an SOC of the battery corresponds to an SOC that is below a predetermined threshold percentage or amount below the 100% charge level given by the TOC voltage, such as below a 5% charge level in one example. A battery may be considered to be charged, i.e., at least partially charged, when the SOC for the battery corresponds to an SOC that is above a first predetermined threshold percentage or amount below the 100% charge level given by the TOC voltage, such as above the 25% charge level in one example. A battery may be considered to be fully charged when the SOC of the battery corresponds to an SOC that is above a second predetermined threshold percentage or amount below the 100% charge level given by the TOC voltage, such as above the 95% charge level for example. A battery may be considered to be at least partially discharged when the SOC of the battery corresponds to an SOC that is below the 100% charge level. The parameters for specifying an SOC described above are examples and may be modified using different values in different embodiments.

In various embodiments, a battery (such as internal battery 171 or PSA battery 174 illustrated in FIG. 1) may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electrochemistries, or one or more cells based a different electrochemistry than Lithium-ion.

As shown in FIG. 1, power storage adapter 172 may be designed to removably couple to portable information handling system 100 using variable power bus 142. For example, variable power bus 142 may include power connections for electrically coupling power storage adapter 172 to portable information handling system 100 as an external load on power storage adapter 172. Variable power bus 142 may also include a communication link to enable power storage adapter 172 to communicate with portable information handling system 100, such as via embedded controller 180. For example, power storage adapter 172 may communicate battery data collected locally at power storage adapter 172 to portable information handling system 100 over a communication link within variable power bus 142. In other embodiments, there may be a communication link between power storage adapter 172 and portable information handling system 100 that is separate from variable power bus 142 instead of, or in addition to, a communication link that is part of variable power bus 142. In some embodiments, a communication link between power storage adapter 172 and portable information handling system 100, or DC power and control 144, may operate in accordance with a System Management Bus (SMBus) protocol for sending and receiving data. As noted above, in particular embodiments, variable power bus 142 is compatible with USB Type-C and may be implemented according to USB Type-C and USB Power Delivery specifications promulgated by USB IF.

In various embodiments, each of internal battery 171 or PSA battery 174 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. The temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, each BMU 170 may include a charging unit (see FIG. 2, charging unit 246) that may control charging cycles for a battery and may apply a TOC voltage as a threshold to determine when charging is complete as the battery voltage increases during charging. The TOC voltage may be lower than or equal to the maximum charge voltage that the battery can physically sustain, in different embodiments. Depending on the actual value for the TOC voltage, a given energy capacity may be stored using the battery. BMU 170 may also be enabled to obtain various types of information associated with a battery and to make decisions according to the obtained information. For example, each BMU 170 may monitor various charging-related parameters or other operating parameters received from one or more batteries, including parameters received from a local battery or parameters received from a remote battery over variable power bus 142.

In some embodiments, parameters monitored by a BMU 170 may include a charging current, a voltage, and a temperature associated with a battery. More specifically, the parameters monitored by the BMU 170 may include any or all of the cell configuration and chemistry of battery cells within the battery, the total voltage of the battery, the voltages of individual battery cells, minimum or maximum cell voltages, the average temperature of the battery as a whole, the temperatures of individual battery cells, the SOC of the battery, the depth of discharge of the battery, the current flowing into the battery, the current flowing out of the battery, and any other measurement of the overall condition of the battery, in various embodiments. In some embodiments, monitoring the SOC may include continuous or periodic monitoring of battery output current, voltage, or both. In some cases, Coulomb counting, in which the charge delivered or stored by a battery is tracked, is used for battery monitoring. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to another device, such as information associated with PSA battery 174 that is provided to or obtained by PSA BMU 170-2 on power storage adapter 172, and which may be provided to portable information handling system 100 over variable power bus 142.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100 or power storage adapter 172, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof. In some embodiments, information indicating an alert condition for PSA battery 174 that is detected by PSA BMU 170-2 on power storage adapter 172 may be provided to portable information handling system 100 over variable power bus 142.

In various embodiments, BMU 170 may further include a DC boost converter (see FIG. 2, DC boost converter 248) that is capable of boosting the voltage provided by the cells within a battery. The DC boost converter may be externally controlled to provide a desired boost voltage output from the battery, such as in response to a control signal or other trigger condition. Because the internal output voltage of the battery may be constrained by the particular battery electrochemistry used to implement the cells, the DC boost converter may enable the battery to output a higher voltage, as desired. In some embodiments, the DC boost converter may be a buck-boost type converter that can step up or step down an input DC voltage.

In some embodiments, embedded controller 180 may implement a voltage control module that senses the current drawn by an electrical load and provides a control signal to BMU170-1 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control BMU 170-1 to produce a particular voltage at the load. For example, the particular voltage level may allow the load to operate in a desired mode of operation. In one embodiment, the particular voltage level indicated by the voltage set signal may be higher than the voltage output by cells within a battery. BMU 170-1 may boost the voltage output by the cells to the voltage indicated by the voltage set signal.

For example, in some embodiments, a battery (such as internal battery 171 or PSA battery 174 illustrated in FIG. 1) may provide electrical power to the information handling system 100 at an output voltage controlled by its respective BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information, and may provide voltage control information based on the determined voltage level to internal BMU 170-1 or PSA BMU 170-2. In one embodiment, voltage control information provided to PSA BMU 170-2 may specify the output voltage level of power storage adapter 172. In another embodiment, voltage control information provided to PSA BMU 170-2 may indicate a preferred voltage range for the output voltage level of power storage adapter 172. In yet another embodiment, voltage control information provided to PSA BMU 170-2 may indicate that the output voltage level of power storage adapter 172 should be increased or should be decreased.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein.

In FIG. 1, power storage adapter 172 is shown receiving AC line power 146 as an external power source. AC line power 146 may represent a connection to line power, such as using a standard line power cable. In some embodiments, AC line power 146 may be a removable connection, such as a cable that plugs into line power in a wall socket, and plugs into a corresponding receptacle included with power storage adapter 172. Also included within power storage adapter 172 in FIG. 1 is AC-DC converter 176. AC-DC converter 176 may receive alternating current (AC) from AC line power 146 and may output one or more DC voltages for supplying electrical power to other components in power storage adapter 172. For example, an output DC voltage from AC-DC converter 176 may be supplied to PSA battery 174 for charging purposes. An output DC voltage from AC-DC converter 176 may be supplied to a DC-DC converter 178, which may then generate one or more other DC voltages. Also, an output DC voltage from AC-DC converter 176 may be directly supplied to variable power bus 142, such as to fulfil a power contract, as described above. Additional details of power storage adapter 172 are described below with respect to FIG. 2.

As will be described in further detail herein, power storage adapter 172 may be enabled to communicate battery data with portable information handling system 100. Accordingly, using variable power bus 142, portable information handling system 100 and power storage adapter 172 may exchange battery data for a battery, such as internal battery 171 or PSA battery 174. The battery data may be any kind of data, such as a SOC, a timestamp, a current, a voltage, or a level of electrical power, among other parameters or data, associated with the battery.

In operation of portable information handling system 100, software updates for various elements and components may be received from time to time and may be installed on portable information handling system 100. Typically, the software updates may comprise various different kinds of software packages that can be installed on portable information handling system 100, and may be received using network interface 160, in particular embodiments, among other media sources for the software updates, including physical memory media. For example, software updates for OS 132 or components of OS 132, such as hardware drivers for OS 132 for particular components, may be received from time to time and installed on portable information handling system 100. In another example, software updates for EC firmware 186 may be received and installed, such that a prior version of EC firmware 186 is removed and replaced with a newer version, when the software update is performed. The software updates may be performed by a user, or may be 'pushed' down to portable information handling system 100 in an automated manner, without user intervention.

As will be described in further detail below, power storage adapter 172 may be enabled to receive, via variable power bus 142, first battery data from portable information handling system 100. The first battery data may affect electronic operation of internal battery 171 in portable information handling system 100 and may be updated from time to time with software updates. Then, after portable information handling system 100 has received the software update with the first battery data, portable information handling system 100 may 'push' relevant portions of the software update, such as the first battery data, to power storage adapter 172 to update operation of PSA BMU 170-2 and PSA battery 174.

Additionally, PSA BMU 170-2 may collect various data for devices connected to power storage adapter 172. For example, a second portable information handling (not shown) system may be connected to power storage adapter 172, when power storage adapter 172 is equipped with multiple ports. In some embodiments, the second portable information handling system may be a cellular telephone of a user of portable information handling system 100. Accordingly, power storage adapter 172 may receive or collect an identifier for the second portable information handling system, and second battery data for the second portable information handling system. The second battery data for the second information handling system may comprise power consumption data for the second information handling system, including at least one of: a charging time, a charging duration, a charging power, and a charging voltage. Power storage adapter 172 may also collect second battery data from sensors included in PSA BMU 170-2, such as sensors that record electrical power supplied to and from PSA battery 174 (including a temperature sensor, a voltage sensor, a charging current sensor, and a discharging current sensor). Then, power storage adapter 172 may communicate the second battery data back to portable information handling system 100, such as to EC 180, from where it may be further used or transmitted to a central location for further usage.

Figure 2:
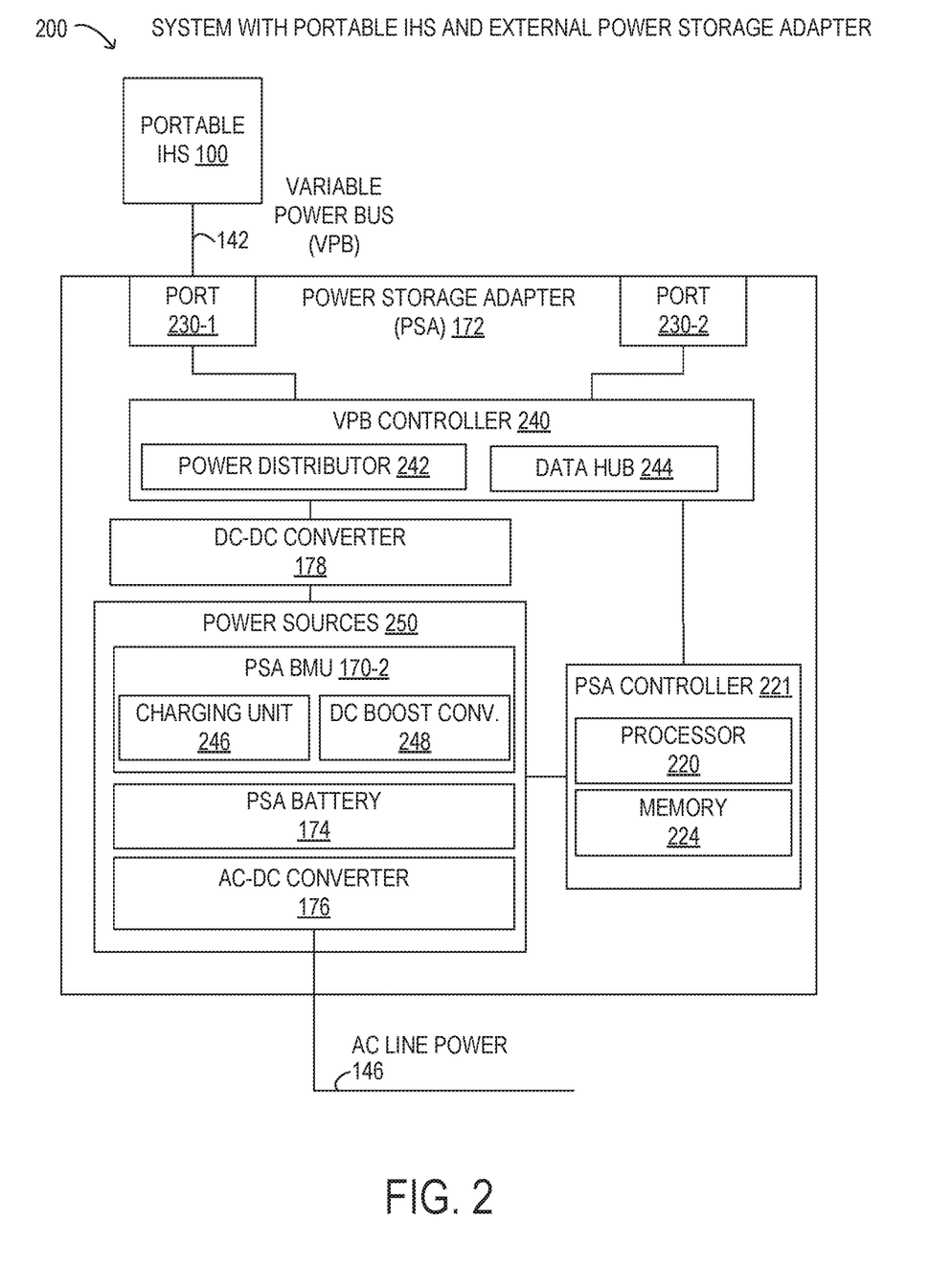
FIG. 2 is a block diagram of selected elements of an embodiment of a portable information handling system with an external power storage adapter.

Referring now to FIG. 2, selected elements of an embodiment of a system 200 with portable information handling system 100 and power storage adapter 172 are shown. FIG. 2 illustrates further internal details of power storage adapter 172. It is noted that FIG. 2 is not drawn to scale but is a schematic illustration. In various embodiments, power storage adapter 172 may be implemented using fewer or additional components than illustrated in FIG. 2.

In FIG. 2, power storage adapter 172 is coupled to portable information handling system 100 via variable power bus (VPB) 142, as described above with respect to FIG. 1. Additionally, power storage adapter 172 is also externally connected to AC line power 146, as described above with respect to FIG. 1.

As shown in FIG. 2, power storage adapter 172 includes power sources 250, a DC-DC converter 178, a VPB controller 240, and two ports 230, as well as a PSA controller 221 comprising processor 220 and memory 224. As shown, power sources 250 comprise an AC-DC converter 176, a PSA battery 174, and a PSA BMU 170-2. In FIG. 2, PSA BMU 170-2 is shown including a charging unit 246 and a DC boost converter 248, while VPB controller 240 is shown including a power distributor 242 and a data hub 244. In some embodiments, DC boost converter 248 may include buck-boost DC conversion functionality to step up or step down an input DC voltage. VBP controller 240 is depicted in FIG. 2 in an implementation with two ports 230-1 and 230-2 that support variable power bus 142. As noted above, variable power bus 142 may be compatible with USB Type-C specifications promulgated by USB IF. Accordingly, in particular embodiments, port 230-1 may be a USB Type-C port. In different embodiments, port 230-1 may also be a USB Type-C port or another type of port, such as a USB Type-A port, among others. Although two ports 230 are shown in the example embodiment of FIG. 2, it will be understood that power storage adapter 172 may include fewer or more ports 230 in different embodiments.

As shown in FIG. 2, power storage adapter 172 includes PSA controller 221, which may perform various actions and functions. In some embodiments, PSA controller 221 is implemented using a custom integrated circuit, or a customizable integrated circuit, such as a field programmable gate array (FPGA). In the embodiment shown in FIG. 2, PSA controller 221 includes processor 220 and memory 224, which may store executable instructions (such as executable code) that may be executed by processor 220, which has access to memory 224. Processor 220 is typically implemented as an integrated circuit, such as a microprocessor or microcontroller, and is enabled to execute instructions that cause power storage adapter 172 to perform the functions and operations described herein. For the purposes of this disclosure, memory 224 may include non-transitory computer-readable media that stores data and instructions for at least a period of time. Memory 224 may comprise persistent and volatile media, fixed and removable media, and magnetic and semiconductor media. Memory 224 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM) or flash memory, non-transitory media, or various combinations of the foregoing. Memory 224 is operable to store instructions, data, or both. Memory 224 may store sets or sequences of instructions that may represent executable computer programs for implementing various functionality provided by power storage adapter 172.

The functionality and implementation details of certain elements in power storage adapter 172, such as AC-DC converter 176, PSA battery 174, PSA BMU 170-2, and DC-DC converter 178, are described above with respect to FIG. 1.

As shown, VPB controller 240 may include power distributor 242, which may represent various electronic components that enable distribution of DC power with respect to variable power bus 142 via ports 230. Specifically, power distributor 242 may receive at least one DC power input from DC-DC converter 178. Power distributor 242 may route or switch power connections to respective ports 230, for example, to enable fulfillment of a power contract, as described above. A power contract established by VPB controller 240, such as according to a USB Power Delivery Specification, may govern the supply of DC power to portable information handling system 100 via port 230-1. VPB controller 240 may also establish another power contract to supply DC power to another device coupled to port 230-2. In some embodiments, VPB controller 240 supplies DC power to both port 230-1 and port 230-2. Power distributor 242 may supply different DC voltages for output power at different ports 230. In particular embodiments, power distributor 242 supplies a different DC voltage to port 230-1 than to port 230-2.

In FIG. 2, data hub 244 may represent electronic functionality to manage various VPB connections over variable power bus 142. Specifically, data hub 244 may control operation of power distributor 242 and may, in turn, be controlled by PSA controller 221, such as by executable code (not shown) stored in memory 224 and executed by processor 220. Additionally, data hub 244 may store state information for each respective port 230, such as USB state information. For example, data hub 244 may store information associated with power contracts that power storage adapter 172 has established or is in the process of negotiating. Accordingly, data hub 244 may store various information about different VPB devices connected to power storage adapter 172 via ports 230. As used herein, the phrase "power consuming device" may refer to any system, apparatus, or device consuming the electrical power provided by a battery. For example, a portable information handling system may consume power for components such as one or more displays, processors, storage media, memory, or other components.

In the illustrated embodiment, charging unit 246 of BMU 170-2 may draw electrical power from AC-DC converter 176, and may, in turn output a charging voltage and charging current suitable to charge the cells of PSA battery 174. The charging voltage and the charging current demands of the battery may be dependent on an electrochemistry or a cell configuration of the battery cells. The charging of the battery may be limited by the current supply capability of the DC source. In some embodiments, the DC source may be AC-DC converter 176. Once the battery reaches 100% state of charge, BMU 170-2 may stop drawing current from the AC-DC converter 176. When a boost source of power is desired, charging unit 246 may also be enabled to supply electrical from PSA battery 174, which is then boosted to a desired output voltage by DC boost converter 248.

In some embodiments, portable information handling system 100 may communicate with power storage adapter 172 to instruct PSA BMU 170-2 to charge the battery cells of PSA battery 174. As previously noted, PSA BMU 170-2 may send information to portable information handling system 100, such as the cell configuration, the state of charge of the battery, or other information. Portable information handling system 100 may communicate with PSA BMU 170-2 using a system management bus (not shown), for example System Management Bus (SMBus) promulgated by SBS Implementers Forum (www.smbus.org), in some embodiments.

In particular, EC firmware 186 may enable EC 180 to update the executable code of internal BMU 170-1, along with certain battery data for internal battery 171, to control the manner in which a battery charger included with internal BMU 170-1 charges internal battery 171. In a similar manner, EC 180 may control the executable code and battery data for PSA BMU 170-2 via variable power bus 142. Specifically, the battery data (not shown) may include various kinds of measurement and operational data. According to one embodiment, the battery data includes battery usage data, such as charging and discharging data, environmental data, processor operating speed data, system power management and cooling system settings, and other data that can collectively affect one or more of a battery's full charge capacity, discharge characteristics, and rate of decline of a battery's full charge capacity, among other data that can contribute to a battery's actual end of life. In particular embodiments, the battery data may comprises a plurality of data structures holding specific data, such as, but not limited to, a high temperature count, a low temperature count, a high voltage usage count, a charging current count, a discharge current count, among other battery data. The measured low and high temperature, high voltage usage, and high charge and discharge currents may recorded or detected by corresponding sensors and may be periodically logged into the respective data structures representing the accumulated data. In one embodiment, the data structures include a counter for each variable parameter that is being tracked and which can affect battery life. In one embodiment, the battery data can include current full charge battery capacity data that may be determined or calculated by BMU 170. BMU 170 may also periodically collect operational data of a portable information handling system. The operational data may be stored in a memory accessible to BMU 170. The operational data of the portable information handling system can include processor speed, cooling fan speed, and a wide range of other operational data that can affect the life of a battery or can be utilized to determine what corrective measures can be taken by BMU 170 to optimize the remaining battery life.

In some embodiments, BMU 170 includes a projected end of life (EOL), a projected aging profile table, and a charge count software module that incorporates charging profiles and charging policies. The charging profiles may include parameters used for charging a battery. The charging policies may specify certain conditions or times when it is best to charge the battery. The projected aging profile table may include a time-based (and probably chronological) mapping of projected rates of decreasing full charge capacity for the battery.

In portable information handling system 100, EC 180 may use the charging profiles and the charging policies to control charging of internal battery 171 to ensure that aspects of battery charging that can affect the rate of decreasing charge capacity, and which are controllable by the charging profiles and policies, are set to ensure that the actual rate of decreasing capacity mirrors or approaches, as best as possible, the projected rates of decreasing charge capacity in the projected aging profiles. As noted above, EC 180 may send the first battery data to power storage adapter 172 to propagate the charging profiles and the charging policies to power storage adapter 172 for PSA battery 174.

For instance, in power storage adapter 172, charging unit 246 may charge PSA battery 174 using a constant current fast charge followed by a constant termination voltage (i.e., "top off voltage") where a desired final battery voltage is applied and the current is allowed to taper off until a low current threshold is reached. According to at least one embodiment, PSA BMU 170-2 may manage gradual changes in one or both of the termination voltage and the fast charge current in order for PSA battery 174 to exhibit or have a life span and specifically a rate of declining full charge capacity that approaches the values provided by or in the projected aging profiles. In one or more embodiments, PSA BMU 170-2 may also adjust system power management to reduce stresses that may detrimentally affect internal battery 171. Thus, if internal battery 171 is intended (or projected) to last three years with an end of life at three years of thirty percent (30%) of original capacity, PSA BMU 170-2 will ensure that at three years, the actual capacity of the internal battery 171 is at or close to 30% of the original capacity.

To perform power management of internal battery 171, PSA BMU 170-2 may check internal battery 171 periodically against the projected aging profile. When PSA BMU 170-2 determines that internal battery 171 is aging at the rate or slower than the rate in the projected aging profiles, PSA BMU 170-2 may continue to have internal battery 171 charged using current charging parameters. If, on the other hand, PSA BMU 170-2 determines that internal battery 171 is aging at a rate faster than the rate in the projected aging profiles, then PSA BMU 170-2 may adjust certain battery data for internal battery 171, such as one or more of (a) the charging parameters, (b) the charging policies and (c) the operational settings. PSA BMU 170-2 may implements specific adjustments so that the actual life of the battery can continue to track as best as possible the projected life of the battery.

According to one or more embodiments, a projected aging profile may include at least one table in which projected remaining battery capacity, expressed as a percentage of the original battery capacity, is correlated to one or more of: (a) a cycle count e.g., a number of times a battery has gone through a charge/discharge process, (b) a calendar life (in months) of a battery, and (3) a number of times a battery has been at or above a particular operating condition threshold. As an example, the operating condition threshold can be a threshold voltage. In a particular embodiment, the particular threshold voltage may be 4.1V per cell in the battery, for example. As other examples, the operating condition threshold can be a charging current threshold or a discharging current threshold. In yet other examples, the operating condition threshold can be a high temperature threshold or a low temperature threshold.

In order to make the determinations of which conditions are at or above or below the respective thresholds, BMU 170 may also include battery data in the form of a data structure (not shown) containing respective default or normal operating parameters or parameter values for each operating condition threshold. Thus, for example, a normal operational parameter data structure may provide a discharge current range for normal operations, and the threshold may include a high discharge current range that is less than a maximum discharge current at which an information handling system can be operated.

Also, a policy portion of the battery data may provide a management interface to the BMU 170. The management interface may allow information technology (IT) providers to set policies which control the battery management settings or selections for an individual user or for groups of users. The policy portion of the first battery data may be provided to power storage adapter 172 by portable information handling system 100.

BMU 170 may tracks or calculate a plurality of variables when performing battery management operations. More specifically, the BMU may track a number of usage variables that are included in the battery data, such as but not limited to:

- $BOD_{AVG}$ (Beginning of Day) which represents an average of a number of time stamps (e.g., the last 2-32 time stamps) for first user present activity of the day;
- $EOD_{AVG}$ (End of Day) which represents an average of a number of time stamps (e.g., the last 2-32 time stamps) for last user present activity of the day;
- $PWR_{AVG}$ (Average Power) which represents an average of the last 32 days of (capacity at BOD-capacity at EOD) divided by time on battery that day, as a % time on battery for the given day;
- $BOD_{BUF}$ (Beginning of Day Buffer) which represents a time value used to adjust BOD earlier for certain calculations;
- $EOD_{BUF}$ (End of Day Buffer) which represents a time value used to adjust EOD later for certain calculations; and
- $T_{RUN}$ (Run Time) which represents a calculated time that the system can operate on remaining battery capacity.

In operation, BMU 170, for each day of the week, may compute running average start and end times for the user, and may record such times as battery data. In the manner of battery management described above, BMU 170 may be enabled to determine a battery capacity of a battery, and to predict a battery capacity of a battery at a given time in the future.

Figure 3:
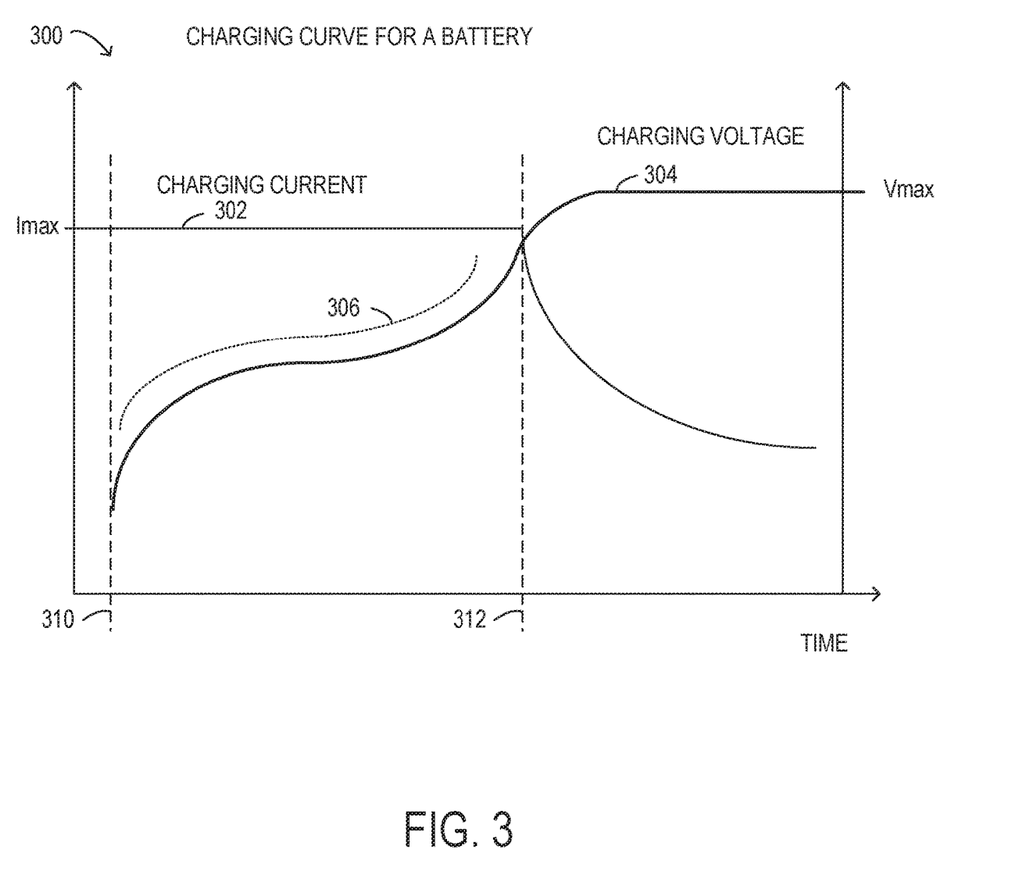
FIG. 3 is a plot showing selected elements of a charging curve for an information handling system battery.

FIG. 3 illustrates a charging curve 300 for a battery, such as internal battery 171 or PSA battery 174. Charging curve 300 is schematically illustrated and is not drawn to scale or perspective. Charging curve 300 may be implemented by BMU 170, for example, using charging unit 246 (see FIG. 2). Charging curve 300 depicts how a charging current 302 and a charging voltage 304 respond over time to various conditions. Specifically, at time 310, it is assumed that the battery is discharged and is charged by supplying charging current 302 that is constant, given by Imax, which is a maximum charging current. In the constant current charging regime between time 310 and time 312, charging voltage 304 may increase from a low value to a higher value as the SOC for the battery increases. At time 312, charging voltage 304 may approach a maximum value, given by Vmax, and may remain constant after time 312. At about time 312, meanwhile, charging current 302 may begin to decrease as the SOC for the battery increases at a lower rate. After time 312, in a constant voltage charging regime, charging current 302 may taper off until at some point, the SOC approaches a maximum value, and no further charging occurs.

Also shown in FIG. 3 is a boost charging voltage 306. Specifically, charging unit 246 may apply boost charging voltage 306 to improve a charging efficiency, for example, by reducing an amount of electrical power consumed during charging, as compared with supplying constant charging voltage Vmax.

Figure 4:
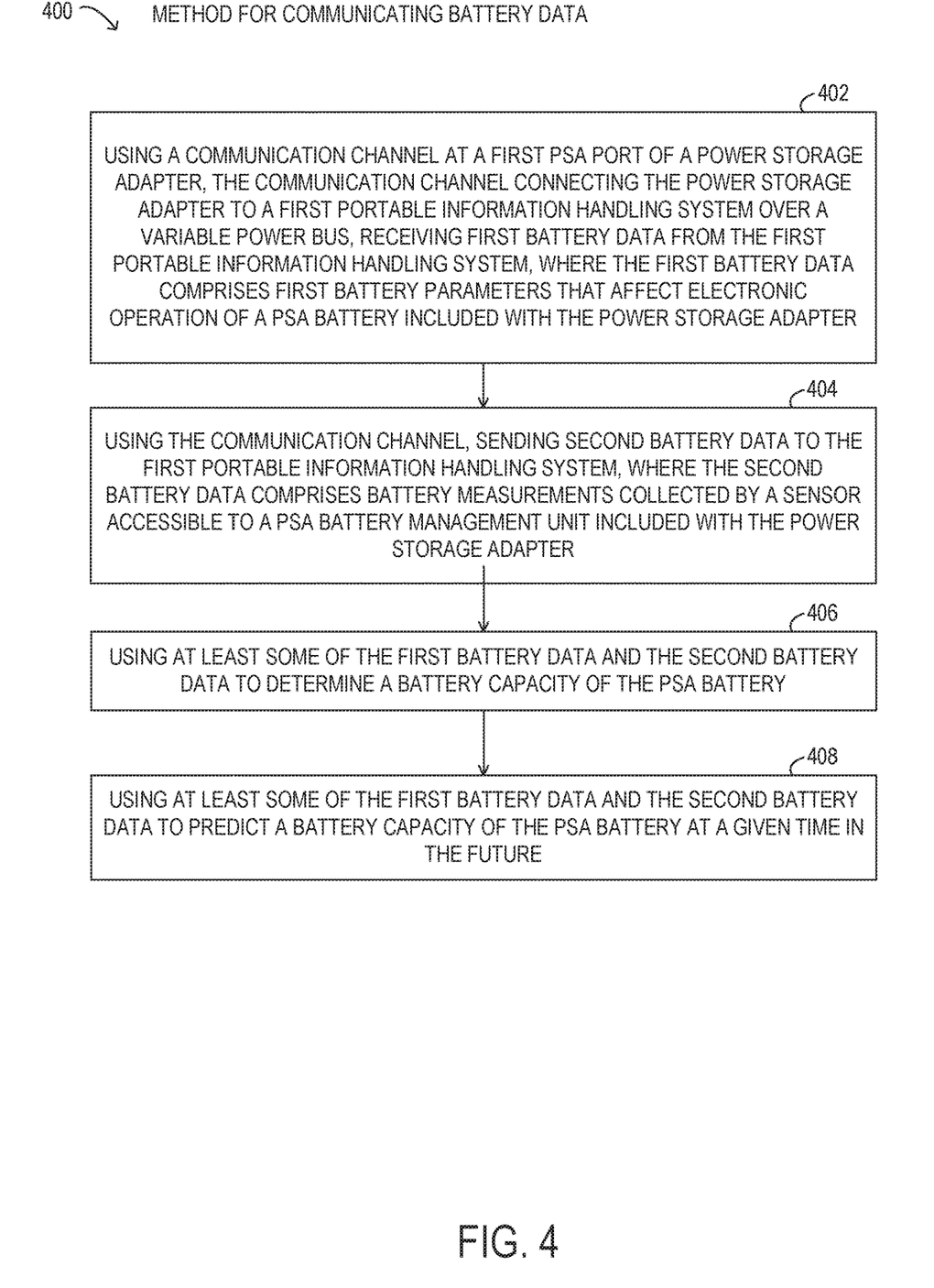
FIG. 4 is a flow chart of selected elements of a method for communicating battery data.

Referring now to FIG. 4, a flow chart of selected elements of an embodiment of method 400 for communicating battery data, as described herein, is depicted in flowchart form. Method 400 may be performed using portable information handling system 100, in conjunction with power storage adapter 172 (see FIGS. 1 and 2) and, in particular, by using variable power bus 142 as a communication channel. It is noted that certain operations described in method 400 may be optional or may be rearranged in different embodiments.

Method 400 may begin at, step 402, by using a communication channel at a first PSA port of a power storage adapter, the communication channel connecting the power storage adapter to a first portable information handling system over a variable power bus, receiving first battery data from the first portable information handling system, where the first battery data comprises first battery parameters that affect electronic operation of a PSA battery included with the power storage adapter. At step 404, using the communication channel, second battery data are sent to the first portable information handling system, where the second battery data comprises battery measurements collected by a sensor accessible to a PSA battery management unit (BMU) included with the power storage adapter. At step 406, at least some of the first battery data and the second battery data is used to determine a battery capacity of the PSA battery. At step 408, using at least some of the first battery data and the second battery data to predict a battery capacity of the PSA battery at a given time in the future.

As disclosed herein, a power storage adapter coupled to a portable information handling system using a variable power bus may receive first battery data from an embedded controller of the portable information handling system. The first battery data may be used by a battery management unit in the power storage adapter for power management of a battery. The power storage adapter may also collect second battery data from other portable information handling systems and send the second battery data back to the embedded controller.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power supply system for supplying power from a power storage adapter (PSA) to a portable information handling system comprising a variable power bus, an internal battery coupled to the variable power bus and an internal battery management unit (BMU) configured to control charging and operation of the internal battery, the power supply system comprising:
a PSA configured for receiving power from an external power source, the PSA comprising:
a first PSA port and a second PSA port, wherein the first PSA port is configured for removably coupling the PSA to the portable information handling system;
an AC-DC converter for converting alternating current to direct current
a PSA battery coupled to the AC-DC converter;
a PSA battery management unit (BMU) configured to control charging and operation of the PSA battery;
a DC-DC converter for receiving electric power at a first voltage from one or more of the AC-DC converter and the PSA battery and supplying electric power at a second voltage; and
a PSA controller having access to memory media storing a plurality of supported capabilities, wherein each supported capability of the plurality of supported capabilities specifies one or more of a power level, an output voltage, a current and a direction of power flow, and a set of PSA instructions executable by the PSA controller to:
using a communication channel at the first PSA port over the variable power bus, receive a first request from the portable information handling system to provide electric power to the portable information handling system; and
using the communication channel, send a set of supported capabilities from the plurality of supported capabilities and a set of PSA battery data to the first portable information handling system, wherein the set of PSA battery data comprises battery measurements collected by one or more sensors accessible to the PSA BMU; and
an embedded controller in the portable information handling system comprising a memory storing a set of embedded controller instructions executable by the embedded controller to:
receive the set of supported capabilities and the PSA battery data;
analyze internal battery data and operational data for the portable information handling system; and
send a second request for electric power to the PSA BMU, wherein the second request for electric power comprises a requested output voltage based on the PSA battery data, the internal battery data and the operational data for the portable information handling system.

2. The power supply system of claim 1, wherein:
the second request comprises a request for a default capability selected from the set of supported capabilities and a request for electric power at a power level with a preferred output voltage; and
the set of PSA instructions are executable by the PSA controller to store the second power level as a preferred power level for the portable information handling system.

3. The power supply system of claim 2, wherein:
the preferred power level comprises one of a preferred output voltage, a preferred range of output voltages, or an indication to increase or decrease the output voltage.

4. The power supply system of claim 1, wherein the one or more sensors comprise at least one of:
a temperature sensor;
a voltage sensor;
a charging current sensor; and
a discharging current sensor.

5. The power supply system of claim 1, wherein the set of embedded controller instructions are executable by the embedded controller to:
analyze the internal battery data and the PSA battery data to determine a battery capacity of the PSA battery.

6. The power supply system of claim 1, wherein the set of embedded controller instructions are executable by the embedded controller to:
analyze the internal battery data and the PSA battery data to predict a battery capacity of the internal battery at a given time in the future.

7. The power supply system of claim 1, wherein
the portable information handling system is a first portable information handling system;
the PSA is removably coupled to the first portable information handling system via a first PSA port;
the PSA is removably coupled via a second PSA port to a second portable information handling system comprising a second internal battery, wherein:
the PSA controller comprises a power distributor configured to supply power to the first information handling system at a first voltage and supply power to the second information handling system at a second voltage;
the second PSA battery data comprises:
an identifier for the second portable information handling system coupled to the second PSA port to receive electrical power from the PSA; and
power consumption data for the second portable information handling system, including at least one of a charging time, a charging duration, a charging power, and a charging voltage.

8. The power supply system of claim 7, wherein at least one of the first portable information handling system and the second portable information handling system comprises a cellular telephone.

9. The power supply system of claim 7, wherein at least one of the first PSA port and the second PSA port is a USB Type-C port, and wherein the variable power bus is a USB Type-C bus.

10. A method for charging a portable information handling system removably coupled to a power storage adapter (PSA), the method comprising:
sending, via a communication channel associated with a PSA port of a power storage adapter (PSA) over a variable power bus, a request for the PSA to supply electric power to the portable information handling system;
in response to receiving PSA battery data comprising PSA battery measurements collected by one or more sensors associated with a PSA battery and operational data associated with the PSA battery;
analyzing internal battery data and operational data for the portable information handling system; and communicating a second request for electric power to the PSA battery management unit, wherein the second request for electric power comprises a requested output voltage based on the PSA battery data, the internal battery data and the operational data for the portable information handling system.

11. The method of claim 10, further comprising storing, by the PSA battery management unit, the second power level as a preferred power level for the portable information handling system.

12. The method of claim 11, wherein the
PSA instructions are executable by the PSA controller to perform:
   receiving internal battery information from the portable information handling system; and
   providing electric power to the portable information handling system based on the internal battery data.

13. The method of claim 10, wherein the one or more sensors comprise at least one of:
   a temperature sensor;
   a voltage sensor;
   a charging current sensor; and
   a discharging current sensor.

14. The method of claim 10, wherein the PSA battery management unit (BMU) is configured to:
use at least some of the first internal battery data and the PSA battery data to determine a battery capacity of the PSA battery.

15. The method of claim 10, further comprising:
using at least some of the first internal battery data and the PSA battery data to predict a battery capacity of the first internal battery at a given time in the future.

16. The method of claim 10, wherein the PSA is removably coupled to a second portable information handling system comprising a second internal battery, wherein second internal battery data comprises:
   an identifier for the second portable information handling system coupled to a second PSA port included with the PSA to receive electrical power from the PSA; and
   power consumption data for the second portable information handling system, including at least one of: a charging time, a charging duration, a charging power, and a charging voltage.

17. The method of claim 16, wherein at least one of the first portable information handling system and the second portable information handling system comprises a cellular telephone.

18. The method of claim 16, wherein at least one of the first PSA port and the second PSA port is a USB Type-C port, and wherein the variable power bus is a USB Type-C bus.

* * * * *